United States Patent [19]

Limb

[11] Patent Number: 4,779,267
[45] Date of Patent: Oct. 18, 1988

[54] TRAFFIC SCHEDULER FOR MULTIPLE ACCESS COMMUNICATION CHANNELS

[75] Inventor: John O. Limb, Flat 8, 9 Downleaze, Sneyd Park, Bristol BS9 1NA, Great Britain

[73] Assignee: John O. Limb, Bristol, Great Britain

[21] Appl. No.: 19,838

[22] Filed: Feb. 27, 1987

[30] Foreign Application Priority Data

Mar. 7, 1986 [GB] United Kingdom ................. 8605613

[51] Int. Cl.⁴ .............................................. H04J 3/02
[52] U.S. Cl. ........................................ 370/94; 370/85
[58] Field of Search ....................... 370/85, 94, 95, 60, 370/13, 17, 86, 84

[56] References Cited

U.S. PATENT DOCUMENTS

| | | | |
|---|---|---|---|
| 4,271,506 | 6/1981 | Broc et al. | 370/13 |
| 4,404,557 | 9/1983 | Grow | 370/86 |
| 4,538,263 | 8/1985 | Gabrielli et al. | 370/86 |
| 4,692,860 | 9/1987 | Andersen | 370/94 |

Primary Examiner—Douglas W. Olms
Assistant Examiner—Wellington Chin
Attorney, Agent, or Firm—Nilsson, Robbins, Berliner, Carson & Wurst

[57] ABSTRACT

A packet communication system comprises a communication medium with two or more stations, each capable of transmitting and receiving packets of information. The system also has channel access means for providing sequential communication between stations; measuring means at each station for measuring the rate of flow of traffic on the communication medium; and control means, responsive to this measurement, for controlling the rate at which packets are admitted to the medium.

14 Claims, 4 Drawing Sheets

←—— Access field ——→

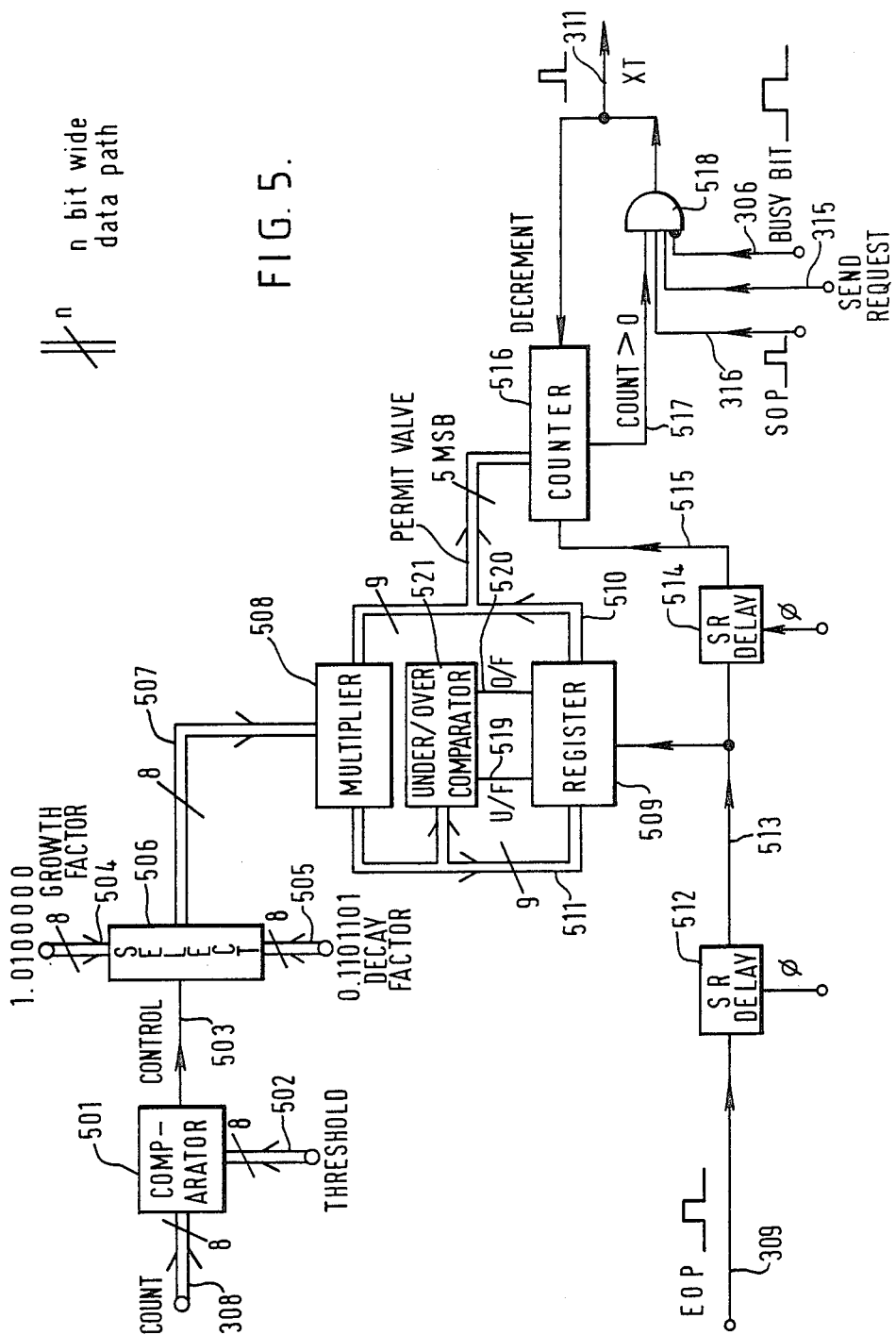

TRAFFIC SCHEDULER FOR MULTIPLE ACCESS COMMUNICATION CHANNELS

BACKGROUND OF THE INVENTION

Local Area Networks (LAN's) that transmit energy in both directions along a transmission medium (a bus) have been used to signal at transmission rates up to about 10 Mb/s. Various schemes such as CSMA/CD (Metcalfe, R. M. and Boggs, D. R., "Ethernet: Distributed Packet Switching for Local Computer Networks", Commun. ACM, Vol. 19, No. 7, pp 395–403, 1976) and token-passing, are used to control access to the medium by stations wishing to transmit. At higher transmission speeds, above about 10 Mb/s, these types of schemes become increasingly inefficient. Methods in which one or more buses are used that transmit energy in only one direction called UBS's (uni-directional bus systems) were then invented to improve efficiency at high speeds. One scheme, Fasnet, described in U.S. Pat. No. 4,532,626, uses two buses, one to carry traffic in one direction and a second, parallel bus to carry traffic in the other direction. A variation called Expressnet (Tobagi, F., Borgonovo, F. and Fratta, L., "Expressnet: A High-Performance Integrated-Services Local Area Network", IEEE J. on Selected Area in Communications, Vol. SAC-1, No. 5, pp 893–913, November 1983) folds a single bus past all stations once, back to the first station and then past all stations a second time in the same direction.

UBS's are much more efficient than the bi-directional bus schemes. They invariably operate in "cycles". An event of some type starts a cycle in which all stations with traffic to transmit send a given number of packets of information. The end of a cycle occurs when one or more stations observes that activity on the medium has ceased. A new cycle is then started. However, it takes of the order of one round-trip propagation time before all stations can determine that activity has ceased and that a new cycle should start. This period is usually small relative to the. length of a cycle. In a typical example, a cycle might consist of 100 packets, each of 100 µs duration (e.g. 1000 bit packets at a signalling rate of 10 Mb/s). The round trip delay time might be 25 µs(e.g. 5 km round-trip length ×5 µs/km). Thus, the length of cycle would be 100×100 µs=10 ms while the "wasted" round trip delay of 25 µs would be negligible in comparison.

However, consider a MAN (Metropolitan Area Network) application where the signalling rate is 1 Gb/s, the length of the network is 50 km round-trip and packets are short, say 250 bits in length. The 100 packet cycle now takes 25 µs while the round-trip delay is approximately 250 µs. The efficiency (utilization) of such a system would have dropped from 99.7% in the previous example to 9.1%.

The same type of inefficiency is experienced in other types of LAN's operating at high speed. A token-passing ring, for example, ensures fair access for all stations by circulating a token from station-to-station around the ring. When a station has the token it may send up to a given number of packets before it must relinquish the token by passing it to the next station. A cycle is now the time it takes for the token to pass once around the ring; the "wasted" round trip delay is now the time for the token to physically propagate from station to station and to be processed by each station. Thus, the performance of a ring at high speed is limited by the same factors as limit UBS's.

A variation of the token ring scheme is a slotted ring in which a slot is seized by the station wishing to transmit by having the station set a BUSY bit to logic 1 (Wilkes, M. V. and Wheeler, D. J., "The Cambridge Digital Communications Ring", Proc. of the local area communication network symposium, Boston, Mass., USA, 1979). The slot is freed by either the origination or destination station resetting the BUSY bit to logic 0. The slot may be used more than once as it propagates around the ring in the case where the destination station rests the BUSY bit. Fairness is guaranteed by different mechanisms in different systems. In ORWELL (Adams, J. L. and Falconer, R. M., "Orwell: A Protocol for Carrying Integrated Services on a Digital Communications Ring", Electronics Letters, Vol. 20, No. 23, pp 970–971, 8th November 1984) and FDDI (American National Standard, FDDI Token Ring, Media Access Control Draft Proposal document X3T9.5/83-16, Rev. 8, 1 March 1985) the time taken for a token to pass around the loop is used to control access to the loop.

SUMMARY OF THE INVENTION

According to the present invention, there is provided a packet communication system comprising a communication medium with two or more stations, each capable of transmitting and receiving packets of information; channel access means for providing sequential communication between stations; measuring means at each station for measuring the rate of flow of traffic on the communication medium; and control means, responsive to this measurement, for controlling the rate at which packets are admitted to the medium.

The invention may be used to improve efficiency of a MAN application described above, by using a scheduling procedure that I will call "statistical scheduling". In addition, the invention may be used to divide the capacity of a LAN or MAN between a number of different types of traffic, for example between digitized voice traffic, computer data and video traffic.

By way of example, I will describe an application of the invention as it applies to a particular type of network, Fasnet. Assume the Fasnet scheme consisting of two unidirectional bus lines 105 and 106, as shown in FIG. 1. All stations are synchronized by timing signals emitted by end station 101 for line 105 and end station 109 for line 106. A station wishing to transmit to a station located to its right will observe slots passing these stations on the upper line 105. When a slot with BUSY=logic 0 is detected, the station may write its data in the slot. It is necessary to have an additional mechanism to prevent upstream stations from hogging the line under heavy traffic conditions and preventing downstream stations from transmitting. So-called "fairness" is introduced by causing the network to cycle using two fields in the headed of the packet, whose structure (200) is shown in FIG. 2a). These two fields are a START bit 201 and an END bit 202 of the access field. The end station 101 for line 105 starts a cycle by writing a "1" in the START bit position 201. Upon reading START=1, a station may seize up to a given maximum number of empty slots before having to pause for the start of a further cycle. The end station 109 for line 105 detects the first slot of a cycle that is empty, by which it may be inferred that all stations that had traffic to transmit have transmitted up to their allowed number of packets. Station 109 then writes a logic 1 in END bit 202 of the next departing packet on line 106. When end station 101 detects an END bit=1, it starts a new cycle on line 105 by writing START=1 in the next occurring slot on line 105. This mechanism is described in detail in U.S. Pat. Nos. 4,439,763 and 4,532,626.

In order to implement statistical scheduling, the Fasnet scheme is modified in the following way. The end stations no longer control access of the stations to the medium by starting cycles. Each station independently controls its own scheduling of packets for transmission. This is done by measuring the amount of traffic on a line. However, note that by observing the BUSY bit on a line, a station only sees the activity of all upstream stations on that line, which is only a partial view of the total activity on the line. The Fasnet access field is modified as shown in FIG. 2(b) in packet 250. A START or END bit is no longer required. The end station 101 or 109 now copies the BUSY bit 210 arriving in a packet on the incoming line to a BUSY-FLAG bit 211 on the next departing packet on the outgoing line. Thus, by observing the sequence of BUSY-FLAGS, a station has a view of the traffic activity on the other line at some prior time.

A station forms an estimate of the amount of current traffic on one of the lines by observing the BUSY-FLAG bits on the other line for a period. Based on this estimate, it then adjusts or controls its own transmission rate. Various so-called control strategies could be proposed. I consider here, by way of example only, one simple control strategy.

An active station observes the BUSY-FLAG of 100 packets. If the number, N, of 1's (BUSY-FLAG=1 if packet used; 0 if not used) exceeds threshold T1, then the station reduces its transmission rate by a factor of, for example, 0.8. If N is less than T1, then the station increases its transmission rate by a factor of, for example, 1.2. T1 may be set, for example, to 90. Such a control procedure might expect to yield a utilization of about 90%, compared to the 9% of the previous MAN example.

There is no guarantee that such a control algorithm will be stable under all conditions, that is, that the utilization will smoothly change in accord with the changing demand. However, note that, should it oscillate, the result is not a failure of the system but a reduction in utilization. Beside improving the utilization of a system, statistical scheduling enables the delay in transmitting a packet to be reduced while maintaining fair access for all stations.

In order to appreciate the difference between "statistical scheduling" described herein and scheduling methods so far employed, consider previous scheduling schemes. A station detects a specific event on a transmission line. The station could be a specific station or any station in the system. In Fasnet, the specific event is the occurrence of an empty packet. In ORWELL it is the receipt of a "trial slot" by any station on the ring. This condition is then signalled to all stations on the medium by a specific code. In Fasnet, an END=1 is written in a packet which eventually results in a START=1 being written on the forward line. In ORWELL, a packet with a specific combination of bits is transmitted by one station and read by all other stations. All stations, in response to this code, attempt to transmit their allocated number of packets.

In contrast, the scheduling method described herein operates by observing all slots that pass through a station. This observation results in an estimate of the traffic rate on the medium, that is, the number of busy packets occurring in a unit of time. No additional specific codes are used to communicate between stations and stations act independently. There is no period that a station must wait at the end of a cycle before receiving information about the occurrence of a specific event. There is no cycle or period common to all stations. Each station makes an independent measurement of the traffic rate.

An extension of the control mechanism described herein is to expand the BUSY and BUSY-FLAG fields shown in FIG. 2(b) by reference numerals 210 and 211, from a single bit each to multiple bit fields. Stations can now be divided into groups that write their own unique code into the BUSY field when a packet is seized. As previously described, the end stations copy the BUSY field on one line into the BUSY-FLAG field on the other line. Now, by having stations count packets of only the type that the station itself writes, the fraction of the transmission capacity allocated to specific traffic types can be controlled beyond any techniques known in the art.

The flexibility of the technique can be illustrated by considering an example in which it is desired to allocate a maximum of 60% of the capacity of the system to type A traffic and up to 60% of the capacity of the system to type B traffic. All type A traffic has priority over type B traffic. Type C traffic may use any spare capacity not used by traffic types A and B. Control is achieved by using a threshold Ta of 60 for type A traffic; a threshold Tb1 of 60 and a threshold Tb2 of, say, 98 for type B traffic; and a threshold Tc of 98 for type C traffic. Stations of type A only count packets of type A for comparison with Ta; stations of type B count packets of type B for comparison with Tb1 and count both type A and type B packets for comparison with Tb2; and stations of type C count all busy slots for comparison with Tc. It is assumed, as before, that stations count packets over a period of 100 packets. Type A stations transmit packets whenever the count is more than Ta. Type B stations transmit packets whenever the count of type B packets is less than Tb1, and the count of type A and type B packets is less than Tb2. Type C stations transmit packets whenever the count of type A, type B and type C packets is less than Tc. This type of control behaviour is very useful where it is desired to have one type of traffic consume unused capacity of another type of traffic without taking capacity from a third type of traffic.

The wording in this example would suggest that the control switches from transmitting to not transmitting as a count exceeds a threshold. In fact a smoother control is used as will be described in detail below.

DESCRIPTION OF THE DRAWINGS

FIG. 5 is a diagram of a control circuit in FIG. 3.

DETAILED DESCRIPTION OF A PREFERRED EMBODIMENT

Figure 1:
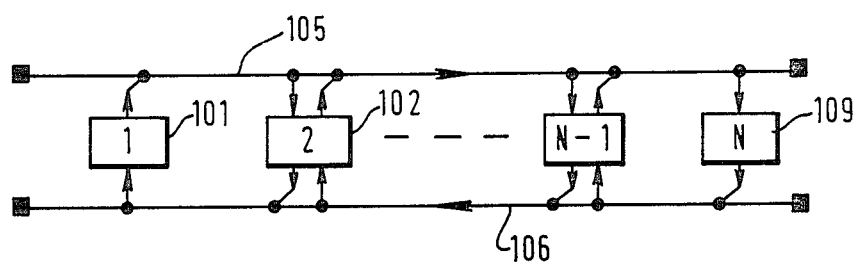
FIG. 1 is a schematic diagram of a Fasnet scheme.
Figure 2A:
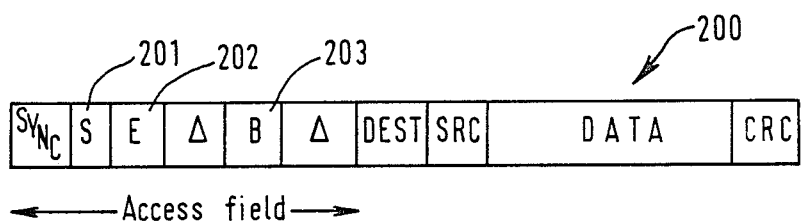
FIG. 2(a) shows a packet used in a Fasnet scheme.
Figure 2B:
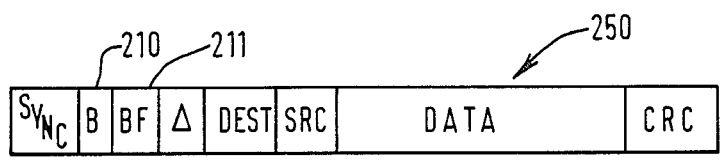
FIG. 2(b) shows a packet used in examples of the present invention.
Figure 3:
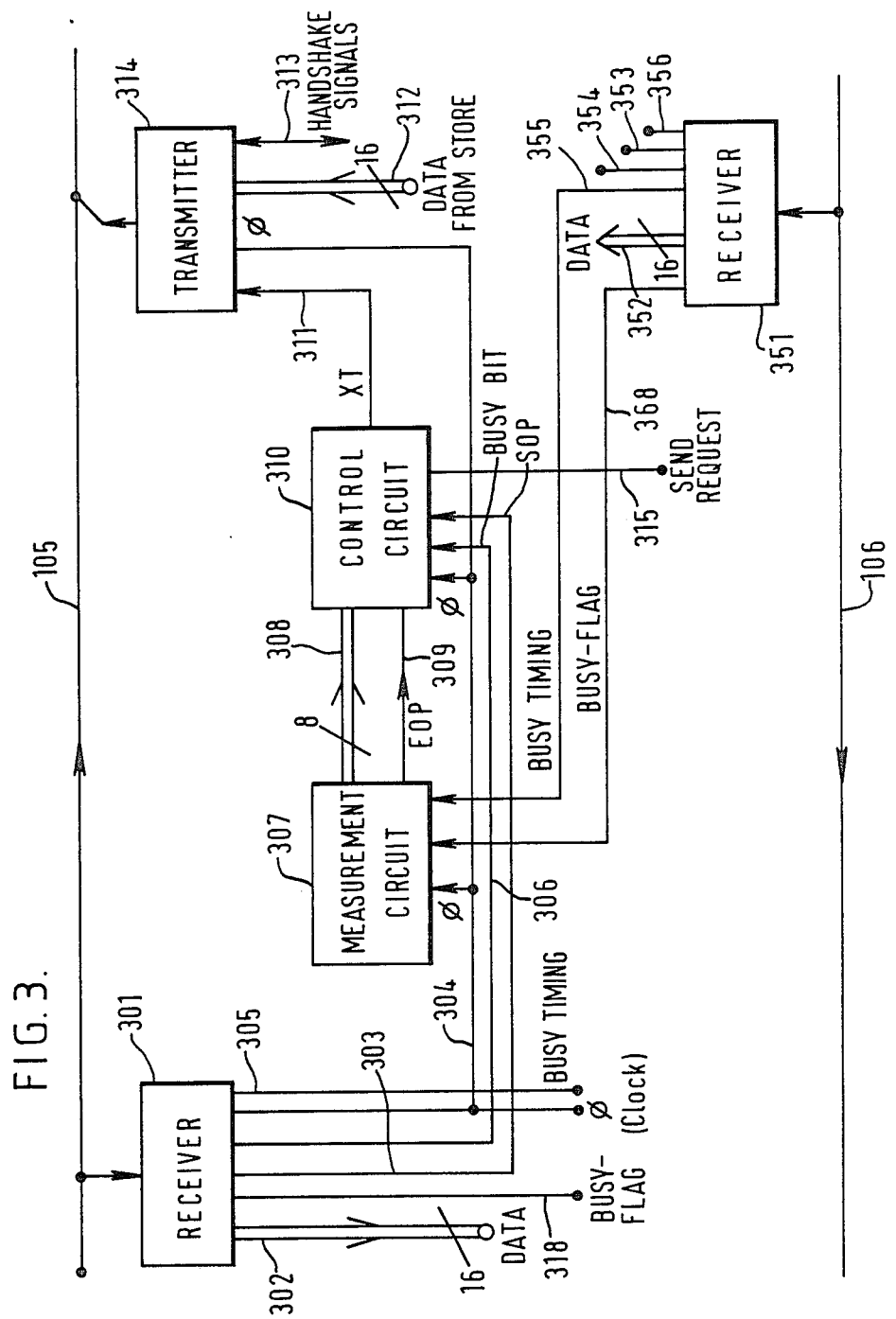
FIG. 3 is a diagram of a circuit arrangement for scheduling station traffic.

By way of example, a circuit arrangement for scheduling station traffic is shown in FIG. 3. The station is connected within a network that functions similarly to a Fasnet local area network as shown in FIG. 1, with a packet structure 250 shown in FIG. 2(b). Referring to FIG. 3, receivers 301 and 351 take the signal from the two transmission lines 105 and 106. The purpose of the receivers is to respond to the analogue signals on the transmission lines, first by analogue amplification and frequency compensation of the signals; then conversion to digital form; and finally extraction of the data and timing signals.

The details of this operation are known to one skilled in the art and are described in detail in Giordano, P. P.; Limb, J. O.; Swartzwelder, J. C., "Implementation of an Experimental High-speed Local Area Network Transceiver", Proceedings of ICC'83, pp. F3.3.1–F3.3.5, June 20–23, 1983, Boston, Mass. The output signals from the receivers are 16-bit wide signals on data signal paths 302, 352; start of packet (SOP) signals on lines 303, 353; clock signals on lines 304, 354; busy-flags on lines 318, 368; busy bits on lines 306, 356; and timing pulses on lines 305, 355 that indicate when valid busy-flags appear on lines 318, 368 respectively. The busy-flags and busy bits indicate the value of the two corresponding fields within the last slot to pass the station on lines 105 and 106.

A measurement circuit 307 and a control circuit 310 schedule traffic for a transmitter 314 and communication line 105 based on the signal on the busy-flag line 368 from receiver 351, not on busy-flag line 318. Busy-flag line 318 together with separate measurement and control circuits, not shown, but identical to circuits 307 and 310, control the scheduling of traffic on communication line 106.

Measurement circuit 307 counts the occurrence of busy-flags occurring during a given period called the control period; the control period is established by counting slots. The count at the end of each control period is indicated by a parallel word supplied to control circuit 310 on a data path 308, together with an end of period (EOP) signal on a line 309 indicating the end of one control period and the beginning of the next.

Control circuit 310, in response to the signal on path 308, determines the number of packets that the station may transmit on communication line 105 during the next control period. As each packet is transmitted, this number is decremented until the count is zero, after which no more packets may be transmitted until the next control period. A transmit signal XT on a line 311 permits the transmitter 314 to read data from a data store and transmit the information in an empty slot on transmission line 105. A line 313 is used to synchronise transmission of parallel words from the data store to the transmitter for each packet.

Figure 4:
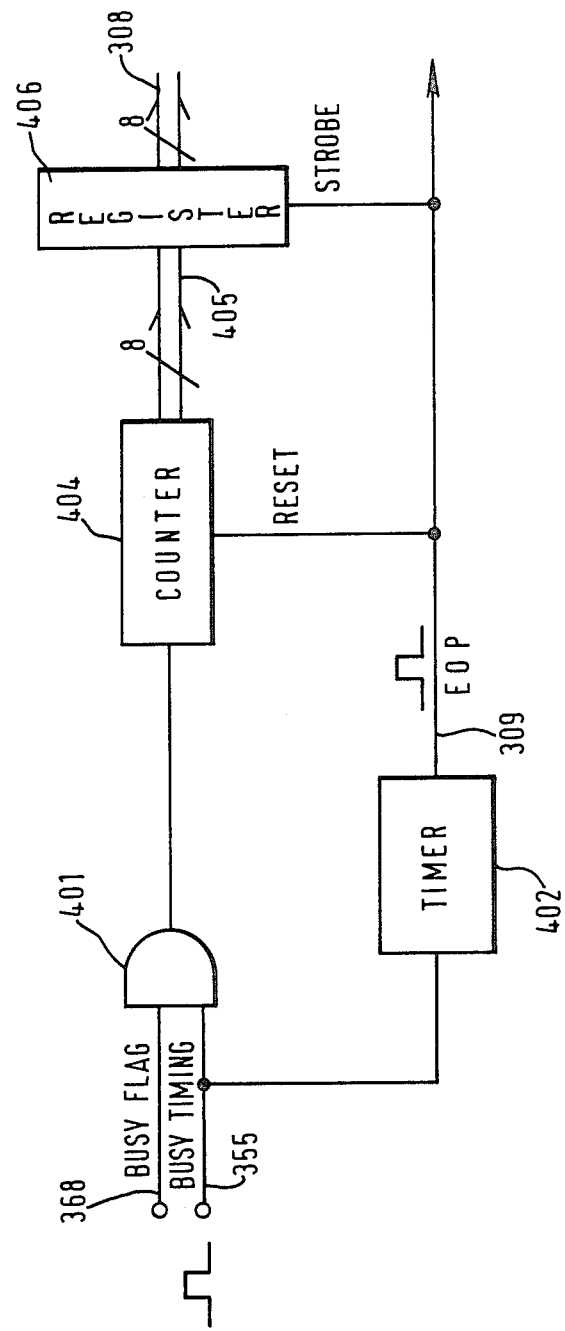
FIG. 4 is a diagram of a measurement circuit in FIG. 3.

The details of measurement circuit 307 are shown in FIG. 4. An AND gate 401 transmits the busy timing pulse on line 355 to a counter 404 whenever the busy-flag is set to logic 1 on line 368. A timer 402, by means of counting the busy timing pulse, one per slot, occurring on line 355 produces a periodic EOP pulse on line 309 each control period, and is used to re-set counter 404. The control period, while not critical, should be preferably as large as the number of active stations in the network.

Coincident with the reset of counter 404, a register 406 is strobed so as to store the parallel data word on a data path 405 ready for use by control circuit 310. If counter 404 is an 8-bit counter, counts up to 255 could be recorded, which would be adequate accuracy for control periods of up to 255 slots.

The control circuit 310 is shown in FIG. 5. The count signal appearing on data path 308 is compared in a comparator 501 with a threshold signal of value T applied to a data path 502. The threshold value T may be hard-wired if the control algorithm is not to be changed or the digital value of the threshold may be set by a control program in a host computer. The comparator 501 produces an output control signal on a line 503 of logic value 1 if the input count on path 308 is greater than the threshold value on path 502. Otherwise the control signal on line 503 is logic value 0.

The purpose of the control signal on line 503 is to apply to a multiplier 508 one of two coefficients via a selector 506 and a data path 507. In case the control signal on line 503 is logic 1, the coefficient on data path 507 is made less than unity and, conversely, if the control signal on line 503 is logic 0, the coefficient is made greater than unity. In the example shown here, the factor greater than unity is called a "growth factor", is applied to selector 506 via a data path 504 and has the value 1.0100000; this is equal to decimal value 1.25. Otherwise a "decay factor", for example the value 0.1101101, which is approximately 0.80 in decimal notation, is used, and is applied to selector 506 via a data path 505. The decay factor is approximately the reciprocal of the growth factor; it should preferably not be identical to the reciprocal of the growth factor.

On a data path 510 is a 9-bit representation of the current value of the number of packets that may be transmitted within a control period, referred to as the "Permit Value". The 9 bits of signal on path 510 might consist of 5 integer (most significant) bits (MSB) and 4 fractional bits, for example.

At the end of a control period, indicated by a pulse on line 309, a delayed pulse is received on a line 513 via a delay circuit 512. The purpose of delay circuit 512 is to permit the transmission of the growth or decay factor to multiplier 508 after the receipt of a new count on data path 308, and the multiplication of the signals on data paths 507 and 510. Thus a data path 511 will hold the previous Permit Value multiplied by the growth or decay factor, as appropriate. This value is then stored in a register 509 in response to the delayed EOP pulse on line 513. The integer component of the Permit Value is loaded in a counter 516 at the end of each period by means of the EOP pulse that is further delayed by means of a shift register 514. Thus counter 516 is pre-set with the integer component of the Permit Value currently stored in register 509. While the value of the counter is greater than 0, a line 517 will be set at logic 1 enabling a packet to be transmitted at the right instant should the host computer have information to transmit. A gate 518 permits transmission of the start of packet (SOP) signal on line 316, which will then initiate the transfer of a packet from the host buffer area to the transmitter 314. This can occur only when the count line 517 is at logic 1, and when the send request line 315 is at logic 1 indicating send packets, and when the busy bit on line 306 is at logic 0, indicating that the slot is empty. Note that for correct operation of gate 518, the SOP pulse and busy-bit pulse must be timed so that the SOP pulse falls entirely within the period of the busy-bit pulse.

The pulse on line 311, which permits the transmitter to transmit a packet, is also applied to counter 516 to decrement the counter. Thus, each time a packet is transmitted the counter is decremented by one until the counter reaches zero. The output signal on line 517 will then change to logic value 0, no more packets can be transmitted, and the counter remains at a count of zero until the start of the next period, when the counter is set to the new Permit Value.

It should be pointed out that the storage loop containing the Permit Value, consisting of multiplier 508, data path 511, register 509 and data path 510, could produce very large or very small signals should a growth factor or a decay factor, respectively, be applied to the multiplier for a large number of consecutive periods. For the effective operation of the control circuit, it is necessary to limit the maximum and minimum values of the Permit Value. This is achieved by means of underflow and overflow signals generated in an underflow/overflow comparator 521 to limit the value of the signal stored in the register 509. For example, let us assume that the minimum value of the Permit Value is 4. Should the value out of the multiplier on path 511 become less than 4 as a result of multiplying the Permit Value by a decay factor, an underflow (U/F) signal on a line 519 would go to logic 1 and the value in the register would be pre-set to the value 4. In response to a new value of the Permit Value that exceeded the minimum, the underflow signal on line 519 would return to logic 0, permitting the register 509 to store the new value on path 511. In a similar manner, an overflow (O/F) signal on a line 520 will limit the value of the Permit Value to a maximum.

The operation of the control circuit may be summarized as follows. If the count on line 308, which is a count of the number of busy slots occurring in a period exceeds a threshold T, the Permit Value, the maximum number of packets that a station may transmit in a period, is decremented by a factor. Conversely, if the threshold count on line 308 is less than a threshold, then the Permit Value is incremented by a factor. In this way the Permit Values calculated independently at each station increase as the total load decreases and decrease as the total load increases.

It is important that the Permit Values in each station do not oscillate, causing an interval when all stations are transmitting followed by an interval when no stations transmit. This can be avoided by making the growth and decay factors close to unity. Further, the Permit Values of different stations should not drift too far apart. This is achieved by building "amnesia" into the storage loop containing the multiplier and register. This can be achieved in a number of ways. A simple way would be to periodically reset the value of register 509 to a value close to the middle of the working range for the Permit Value.

Another way is to converge the Permit Value to a target value by a small factor at each new calculation of the Permit Value.

The value of the threshold T controls the average amount of traffic on the transmission medium. Thus, if T were set to a value equal to half the period set by the timer 402 then the transmission medium, on average, would be only half full. Where there is only one class of traffic on the transmission medium it will be most advantageous to have T less than, but nearly equal to, the period. The closer T is set to the period the greater the number of packets that can be transmitted, on average, during a period, but the greater the possibility that stations further along the medium will experience significantly greater delays in transmitting packets.

It would be consistent with the current control algorithm to have more than one class of traffic on the medium and use multibit fields for the busy "bit" and busy "flag". A specific code would be assigned to each type of traffic. For example, if a 3-bit field were used, 001 might denote data traffic, 010 might denote voice traffic, 011 might denote video traffic and 100 might denote high priority data traffic. The allocation of a specific fraction of the transmission medium capacity to a particular traffic type is now possible by having stations of that particular type count in counter 404 only those busy "flag" fields that match the particular code assigned to that type of station. The modification to the embodiment illustrated in FIG. 4 to achieve selective control of a particular traffic type could be easily made by one skilled in the art.

By way of example only, statistical scheduling has been applied to a unidirectional bus system that is very similar to Fasnet. The measurement and control circuits could be readily modified to operate with other types of local area networks, in particular token rings, slotted rings, CSMA/CD buses and other types of unidirectional bus schemes such as Expressnet. To enable all stations in FIG. 1 to detect all traffic on a communication line, the functioning of the system as described in U.S. Pat. No. 4,532,626 is modified so that the busy bit is written on the opposite lines as a busy-flag by the end station. All stations see all traffic on a token ring so that no modification to the basic access method would be required to incorporate the control method described herein. In a slotted ring where the slot is marked empty by the originating station when a transmitted packet returns to the originating station, all stations see all traffic. Again, the basic access method would not need to be modified. All stations do not see all busy packets when the destination station marks the slot empty, for example in Orwell (mentioned above). However, a station can apply the control strategy described herein based on just those packets that are seen by the station.

I claim:

1. A packet communication system comprising:
    a communication medium with two or more stations, each of said stations being capable of transmitting and receiving packets of information;
    channel access means adapted to provide sequential communication between said stations;
    measuring means at each of said stations adapted to measure the rate of flow of traffic on said communication medium, each of said measuring means comprising means for counting the number of busy slots occurring within a time interval; and
    control means at each of said stations, each of said control means being responsive to the measurement of the rate of flow of traffic on said communication medium to control the rate at which packets are admitted to said communication medium, wherein each of said control means is adapted to determine the maximum number of packets that the respective station may attempt to transmit within a specified time interval in response to the most recent count and other previous counts of busy time slots.

2. A packet communication system as claimed in claim 1, wherein each of said control means is adapted to compare the counts of the number of busy slots in previous such intervals with a desired target value and, in response thereto, determine the maximum number of packets that the respective station can transmit in an interval.

3. A packet communication system as claimed in claim 2, wherein each of said control means is adapted to operate independently with respect to the control means of the other of said stations.

4. A packet communication system as claimed in claim 2, wherein each of said control means includes means adapted so that substantial tracking is maintained between the individual packet transmission rates, independently calculated for each of said stations.

5. A packet communication system as claimed in claim 1, wherein each of said stations is adapted, upon writing in an empty slot, to write in a busy field of the slot a code indicating the type of data being transmitted; wherein each of said measuring is adapted to count the occurrence of packets of one or more codes; and wherein each of said control means is adapted to respond to the counts of the codes.

6. A packet communication system as claimed in claim 5, wherein each of said control means is adapted to determine the maximum number of packets which the respective station may transmit by incrementing or decrementing the maximum number of packets used in the previous interval depending upon the number of busy packets in an interval.

7. A packet communication system as claimed in claim 1, wherein the communication medium comprises a slotted ring in which each of said stations may write in a slot that has a busy bit set to logic 0, setting the busy bit to logic 1, each transmitting station restoring the busy bit to logic 0 when the filled slot returns to the transmitting station.

8. A packet communication system as claimed in claim 7, wherein each of said measuring means is adapted to count the number of busy packets during a given interval and the respective control means is adapted, in response thereto, to determine the maximum number of packets that the respective station may transmit within an interval.

9. A packet communication system as claimed in claim 1, wherein the communication medium comprises a slotted ring in which each of said stations may write in a slot that has a busy bit set to logic 0, setting the busy bit to logic 1, each receiving station restoring the busy bit to logic 0.

10. A packet communication system as claimed in claim 9, wherein each of said measuring means is adapted to count the number of busy packets during a given interval and the respective control means is adapted, in response thereto, to determine the maximum number of packets that the respective station may transmit within an interval.

11. A packet communication system as claimed in claim 1 wherein the communication medium comprises a carrier sense multiple access bus.

12. A packet communication system as claimed in claim 11, wherein each of said measuring means is adapted to count the number of busy packets during a given interval and the respective control means is adapted, in response thereto, to determine the maximum number of packets that the respective station may transmit within an interval.

13. A packet communication system as claimed in claim 1, wherein the communication medium comprises a token ring.

14. A packet communication system as claimed in claim 13, wherein each of said measuring means is adapted to count the number of busy packets during a given interval and the respective control means is adapted, in response thereto, to determine the maximum number of packets that the respective station may transmit within an interval.

* * * * *